US012131752B2

(12) United States Patent
Cho

(10) Patent No.: US 12,131,752 B2
(45) Date of Patent: Oct. 29, 2024

(54) TECHNOLOGY OF MANAGING VIDEO COLLABORATION SERVICE

(71) Applicant: RAKUTEN SYMPHONY KOREA, INC., Seoul (KR)

(72) Inventor: Jiwook Cho, Hwaseong-si (KR)

(73) Assignee: RAKUTEN SYMPHONY KOREA, INC., Seoul (KR)

( * ) Notice: Subject to any disclaimer, the term of this patent is extended or adjusted under 35 U.S.C. 154(b) by 0 days.

(21) Appl. No.: 18/027,244

(22) PCT Filed: Oct. 5, 2022

(86) PCT No.: PCT/KR2022/014948
§ 371 (c)(1),
(2) Date: Mar. 20, 2023

(87) PCT Pub. No.: WO2024/075860
PCT Pub. Date: Apr. 11, 2024

(65) Prior Publication Data
US 2024/0290352 A1    Aug. 29, 2024

(51) Int. Cl.
*G11B 27/031* (2006.01)
(52) U.S. Cl.
CPC ................. *G11B 27/031* (2013.01)

(58) Field of Classification Search
USPC .................................... 386/248, 278
See application file for complete search history.

(56) References Cited

U.S. PATENT DOCUMENTS

| 2018/0198463 | A1* | 7/2018 | McMichael | H04L 69/04 |
| 2019/0200084 | A1* | 6/2019 | Gilson | H04N 21/4728 |
| 2019/0253072 | A1* | 8/2019 | McMichael | H03M 7/24 |
| 2019/0319948 | A1* | 10/2019 | Triola | H04L 9/3247 |

* cited by examiner

*Primary Examiner* — Nigar Chowdhury
(74) *Attorney, Agent, or Firm* — Sughrue Mion, PLLC

(57) ABSTRACT

An electronic device according to various embodiments of the present disclosure may be configured to receive, from a first terminal device, at least one edited segment among a plurality of segments of an image file and at least one edited segment among a plurality of segments of metadata, update the image file and the metadata stored in the one or more memories, determine, in response to a second terminal device accessing the image file, whether an image file the second terminal device has is the latest version, and determine, in response to determining that the image file the second terminal device has is not the latest version, a transmitting device to transmit the at least one edited segment of the image file and the at least one edited segment of the metadata to the second terminal device.

15 Claims, 10 Drawing Sheets

FIG. 4
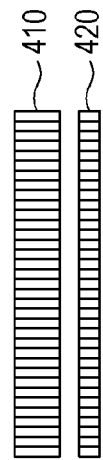
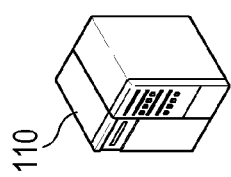
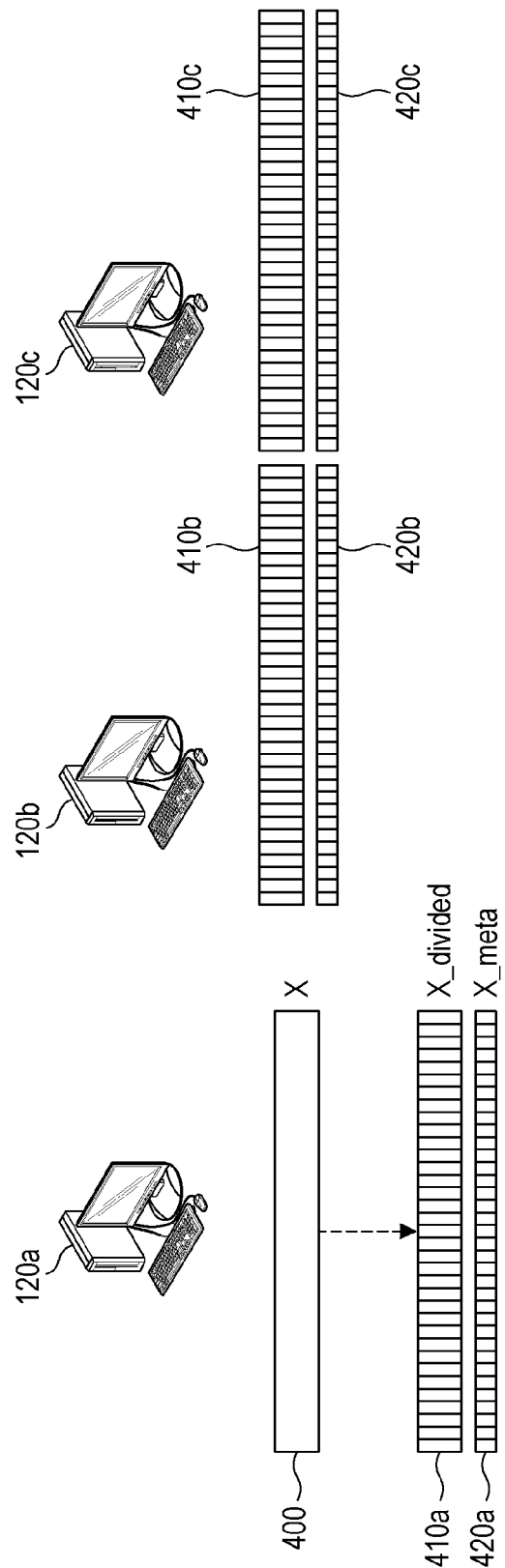

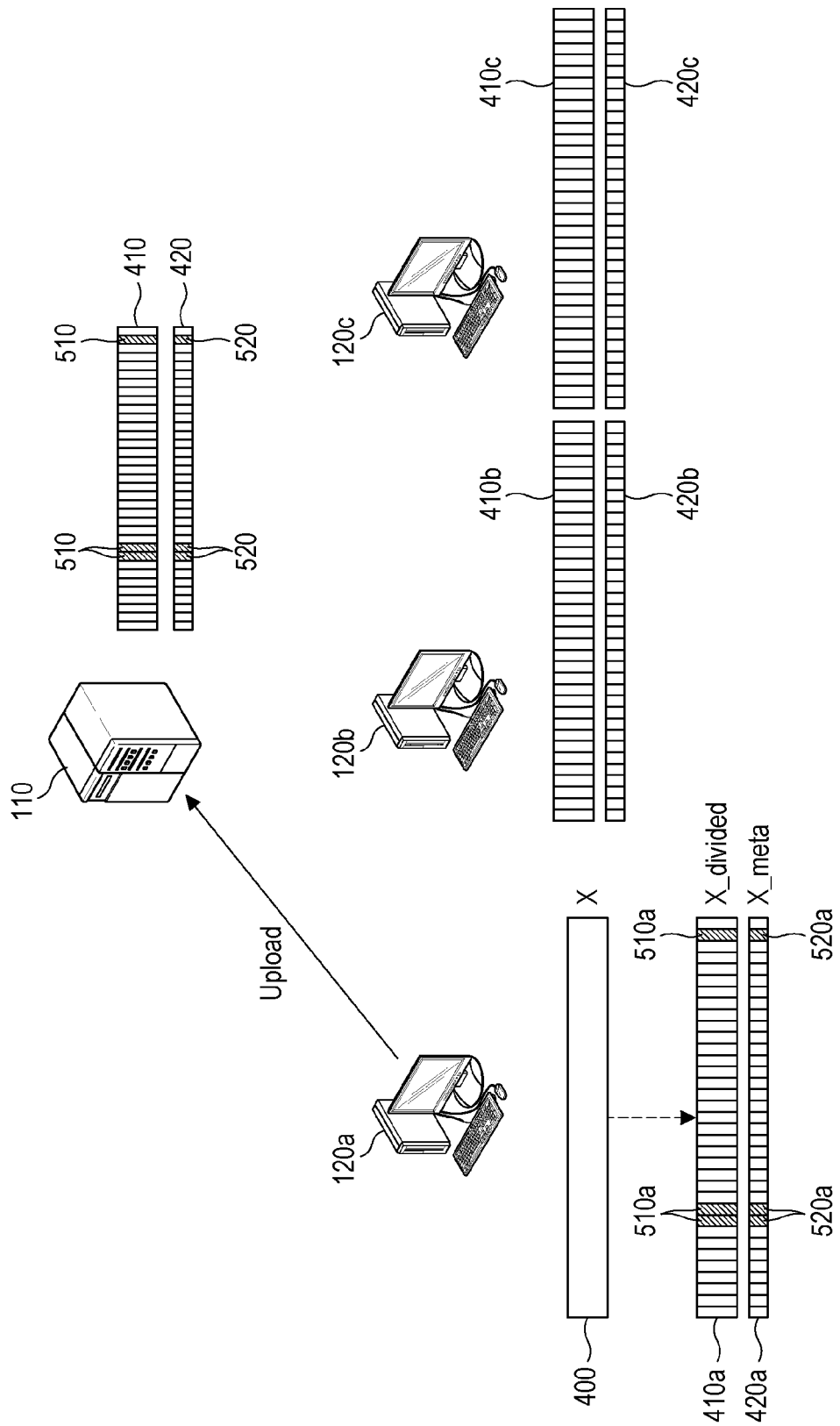

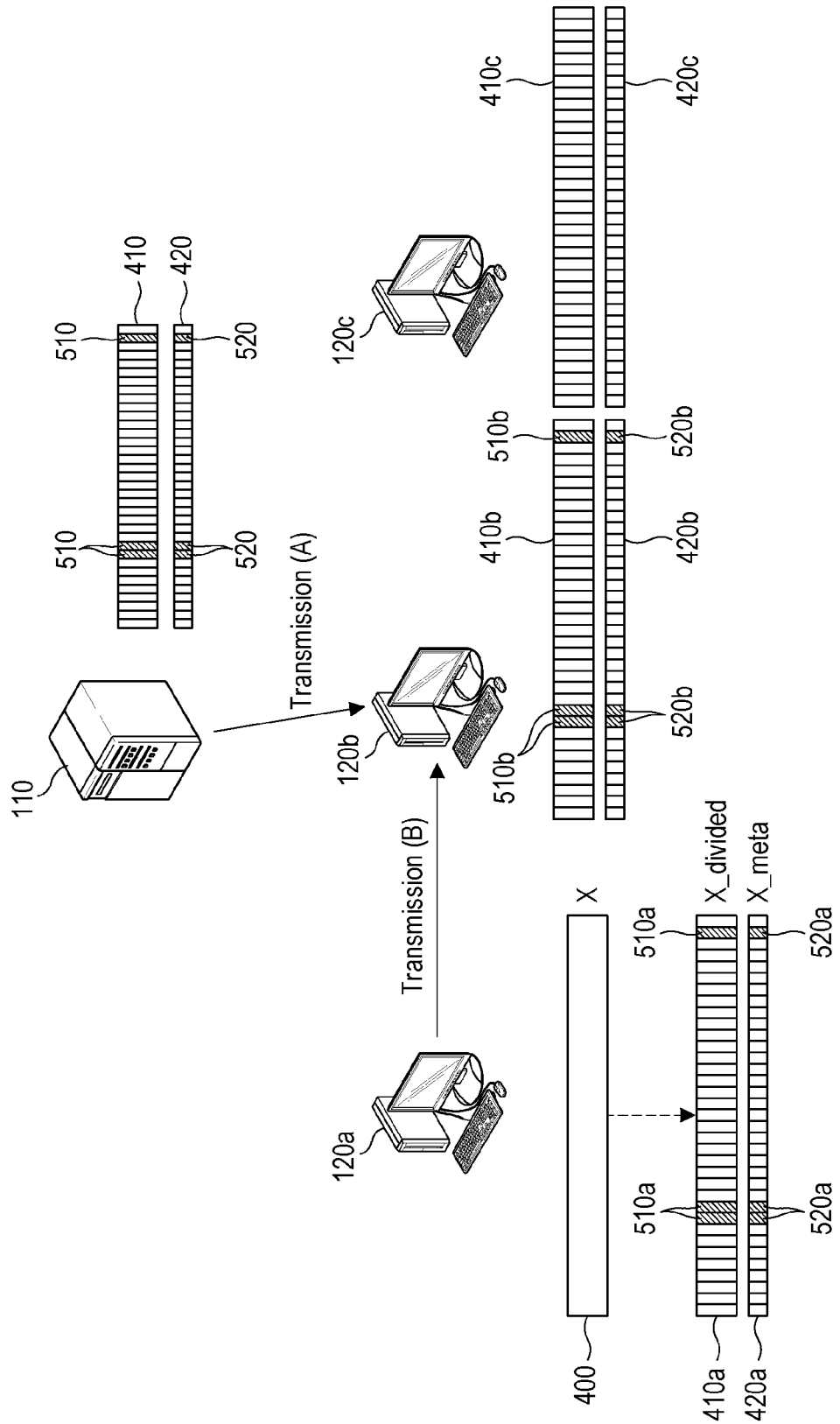

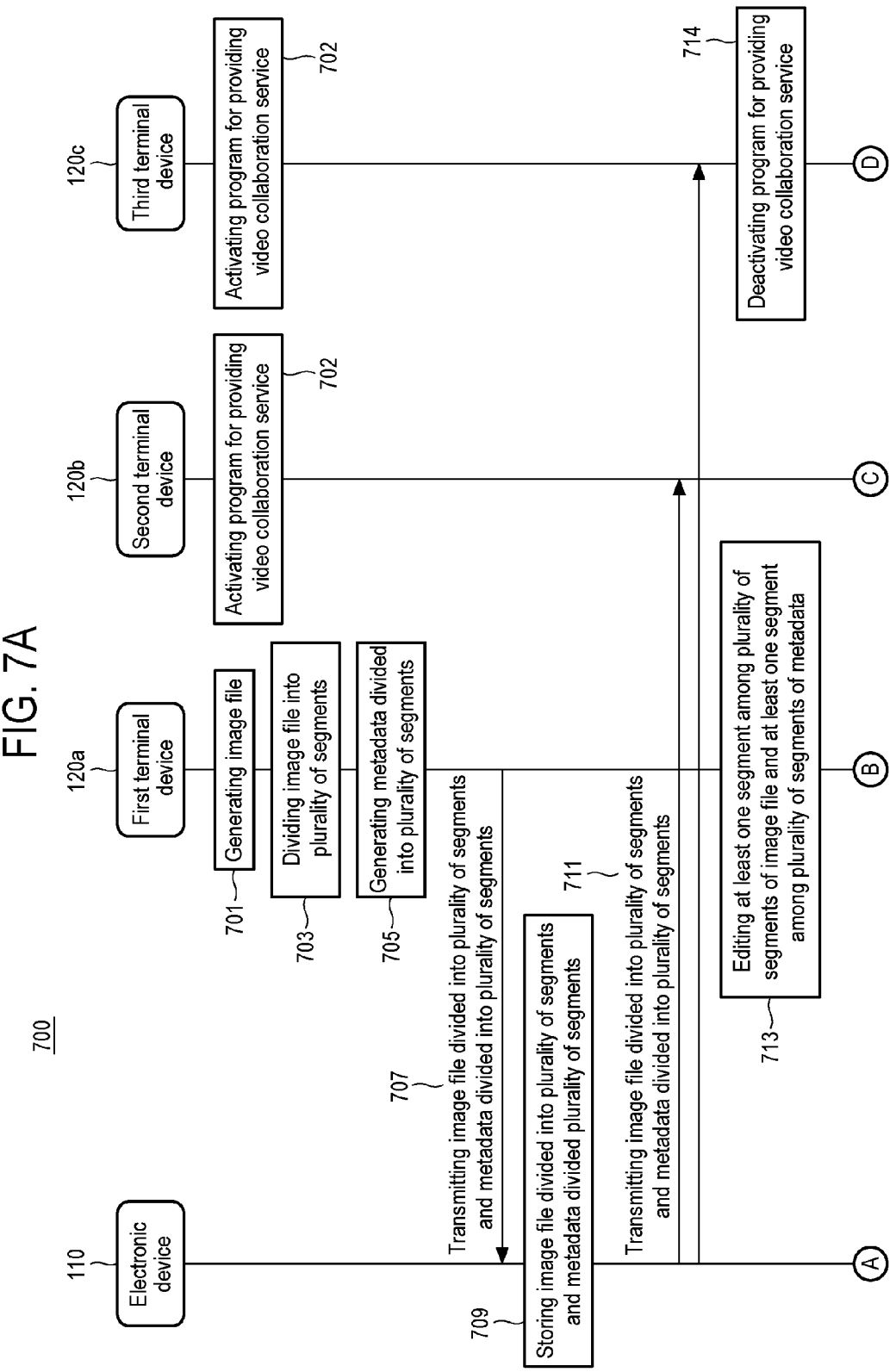

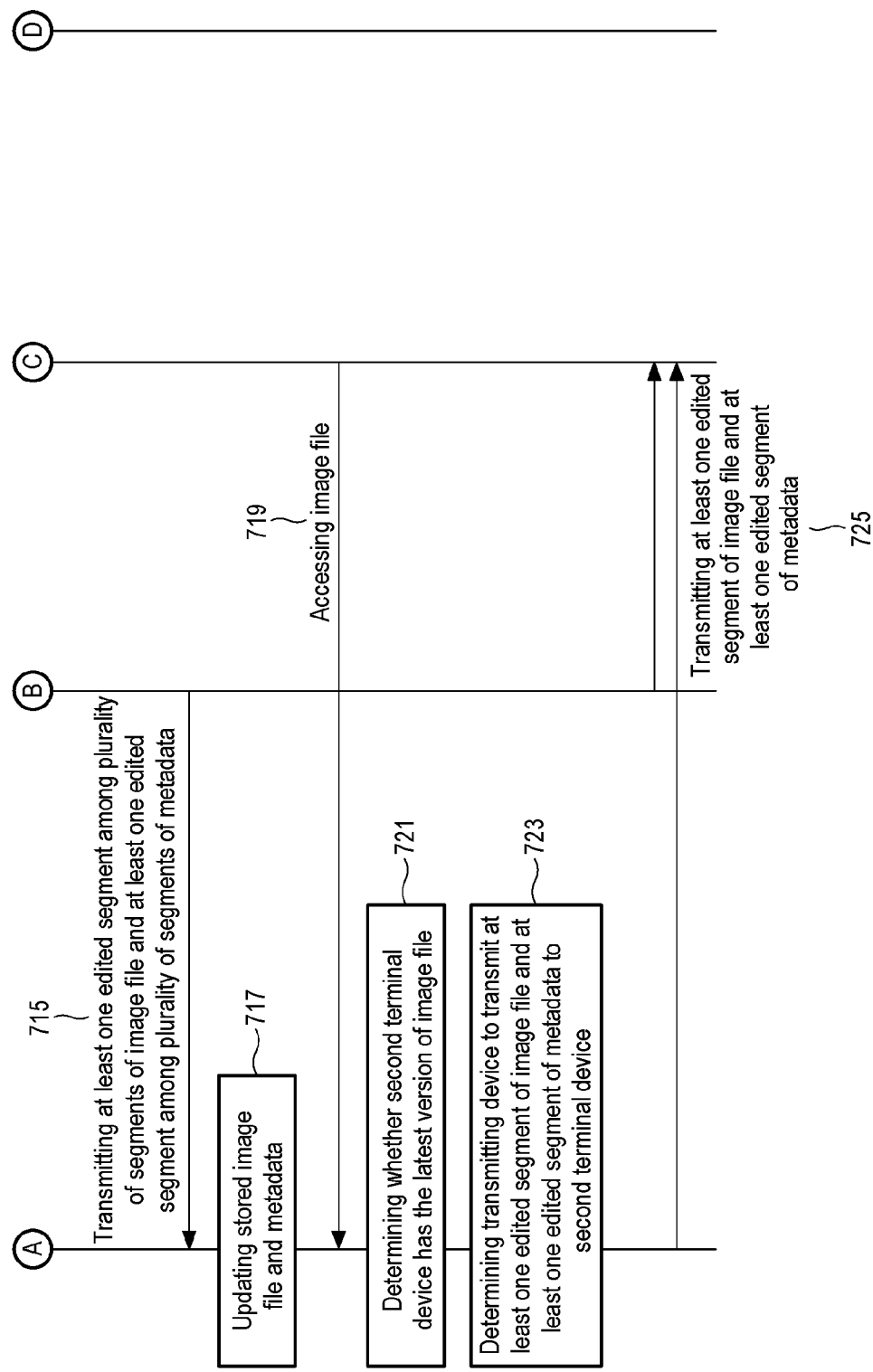

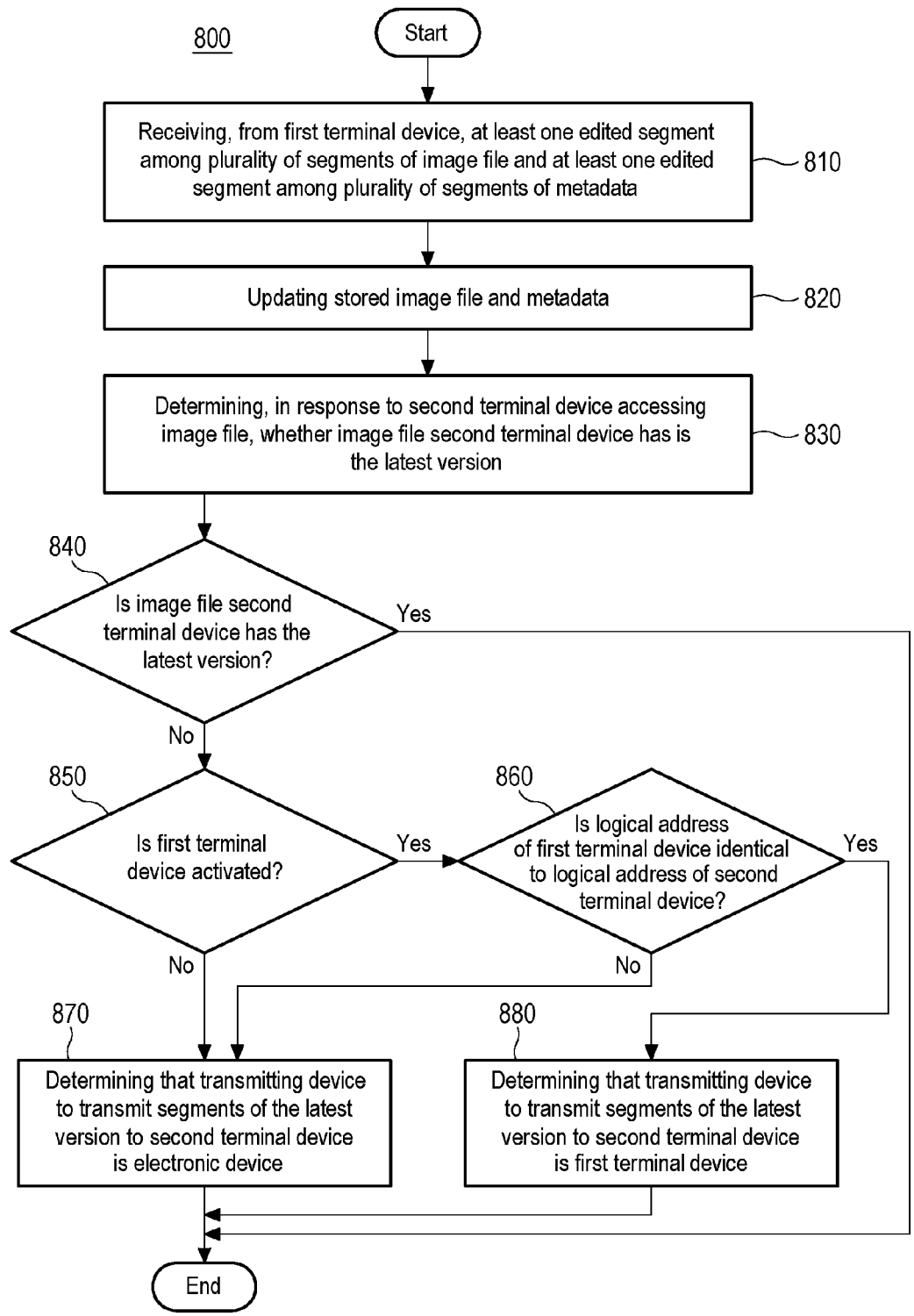

TECHNOLOGY OF MANAGING VIDEO COLLABORATION SERVICE

CROSS REFERENCE TO RELATED APPLICATIONS

This application is a National Stage of International Application No. PCT/KR2022/014948 filed Oct. 5, 2022.

TECHNICAL FIELD

The present disclosure relates to a technology of managing a video collaboration service.

BACKGROUND

A video collaboration service refers to a service in which each of a plurality of terminal devices connects to a cloud server, accesses and edits (or modifies) an image file stored in the server, and downloads (uploads) the image file from the server. The plurality of users may use the plurality of terminal devices to access specific image files and may edit specific image files, respectively. If the plurality of terminal devices simultaneously connect and simultaneously access image files in connection with a conventional video collaboration service, a large amount of traffic may occur in the server.

SUMMARY

It is an aspect of the present disclosure to provide a method for reducing traffic occurring in a video collaboration service.

An electronic device according to an embodiment of the present disclosure may include: a communication circuit communicatively connected with a plurality of terminal devices; one or more memories configured to store an image file divided into a plurality of segments and metadata related to the image file and divided into a plurality of segments; and one or more processors. The one or more processors according to various embodiments may receive, from a first terminal device, at least one edited segment among the plurality of segments of the image file and at least one edited segment among the plurality of segments of the metadata. The one or more processors according to various embodiments may update the image file and the metadata stored in the one or more memories, based on the at least one edited segment of the image file and the at least one edited segment of the metadata. The one or more processors according to various embodiments may determine, in response to a second terminal device accessing the image file, whether an image file the second terminal device has is the latest version. The one or more processors according to various embodiments may determine, in response to determining that the image file the second terminal device has is not the latest version, a transmitting device to transmit the at least one edited segment of the image file and the at least one edited segment of the metadata to the second terminal device, among the electronic device and the first terminal device.

A method according to an embodiment of the present disclosure may include receiving, from a first terminal device, at least one edited segment among a plurality of segments of an image file and at least one edited segment among a plurality of segments of metadata. An image file divided into the plurality of segments and metadata related to the image file and divided into the plurality of segments being stored in one or more memories of an electronic device. The method may include updating the image file and the metadata stored in the one or more memories, based on the at least one edited segment of the image file and the at least one edited segment of the metadata. The method may include determining, in response to a second terminal device accessing the image file, whether an image file the second terminal device has is the latest version. The method may include determining, in response to determining that the image file the second terminal device has is not the latest version, a transmitting device to transmit the at least one edited segment of the image file and the at least one edited segment of the metadata to the second terminal device, among the electronic device and the first terminal device.

In connection with a non-transitory computer-readable recording medium in which a program to be executed by a computer is recorded according to an embodiment of the present disclosure, the program may include executable instructions which, when executed by one or more processors, cause the one or more processors to perform: receiving, from a first terminal device, at least one edited segment among the plurality of segments of an image file and at least one edited segment among the plurality of segments of metadata, an image file divided into the plurality of segments and metadata related to the image file and divided into the plurality of segments being stored in one or more memories of an electronic device; updating the image file and the metadata stored in the one or more memories, based on the at least one edited segment of the image file and the at least one edited segment of the metadata; determining, in response to a second terminal device accessing the image file, whether an image file the second terminal device has is the latest version; and determining, in response to determining that the image file the second terminal device has is not the latest version, a transmitting device to transmit the at least one edited segment of the image file and the at least one edited segment of the metadata to the second terminal device, among the electronic device and the first terminal device.

According to at least one embodiment of the present disclosure, traffic occurring in an electronic device corresponding to the server stage of a system of managing a video collaboration service may be reduced. By reducing the traffic occurring in the electronic device, traffic-related costs may be reduced.

According to at least one embodiment of the present disclosure, reduction in upload and download speeds due to large-capacity image file may be prevented.

According to at least one embodiment of the present disclosure, edited segments are transmitted among an image file divided into the plurality of segments, thereby reducing traffic occurring therefrom.

BRIEF DESCRIPTION OF DRAWINGS

FIG. 4 illustrates a method of managing a video collaboration service according to an embodiment of the present disclosure.

FIG. 5A and FIG. 5B illustrate a method of managing a video collaboration service according to an embodiment of the present disclosure.

FIG. 7A and FIG. 7B are flowcharts illustrating operations of a system according to an embodiment of the present disclosure.

FIG. 8 is a flowchart illustrating operations of an electronic device according to an embodiment of the present disclosure.

DETAILED DESCRIPTION

Figure 1:
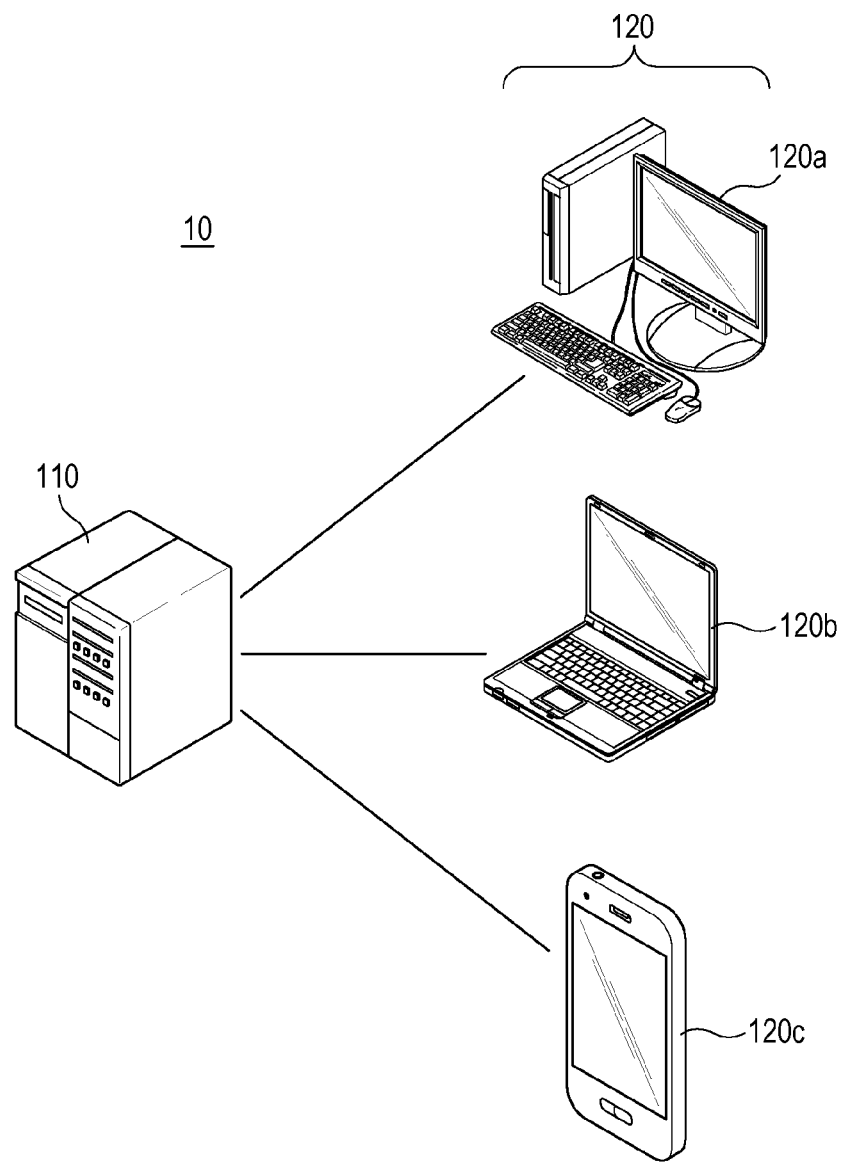
FIG. 1 illustrates a system of managing a video collaboration service according to an embodiment of the present disclosure.

Embodiments of the present disclosure are illustrated for describing the technical spirit of the present disclosure. The scope of the claims according to the present disclosure is not limited to the embodiments described below or to the detailed descriptions of these embodiments.

All technical or scientific terms used herein have meanings that are generally understood by a person having ordinary skill in the art to which the present disclosure pertains, unless otherwise specified. The terms used herein are selected for only more clear illustration of the present disclosure, and are not intended to limit the scope of claims in accordance with the present disclosure.

The expressions "include", "provided with", "have" and the like used herein should be understood as open-ended terms connoting the possibility of inclusion of other embodiments, unless otherwise mentioned in a phrase or sentence including the expressions.

A singular expression can include meanings of plurality, unless otherwise mentioned, and the same is applied to a singular expression stated in the claims.

The terms "first", "second", etc. used herein are used to identify a plurality of components from one another, and are not intended to limit the order or importance of the relevant components.

The expression "based on" used herein is used to describe one or more factors that influences a decision, an action of judgment or an operation described in a phrase or sentence including the relevant expression, and this expression does not exclude additional factor influencing the decision, the action of judgment or the operation.

When a certain component is described as "coupled to" or "connected with" another component, this should be understood as having meaning that the certain component may be coupled or connected directly to the other component or that the certain component may be coupled or connected to the other component via a new intervening component.

Hereinafter, embodiments of the present disclosure will be described with reference to the accompanying drawings. In the accompanying drawings, like or relevant components are indicated by like reference numerals. In the following description of embodiments, repeated descriptions of the identical or relevant components will be omitted. However, even if a description of a component is omitted, such a component is not intended to be excluded in an embodiment.

FIG. 1 illustrates a system 10 according to an embodiment of the present disclosure.

The system 10 according to an embodiment of the present disclosure may include an electronic device 110 and a plurality of terminal devices 120. The system 10 may be configured to operate a video collaboration service. The plurality of terminal devices 120 may be communicatively connected with the electronic device 110 so as to transmit or receive various data. For example, each of the plurality of terminal devices 120 may access image files stored in the electronic device 110, may edit image files, may upload image files to the electronic device 110, and may download image files from the electronic device 110. The plurality of terminal devices 120 may connect to each other so as to exchange various types of information or files. For example, the first terminal device 120a may connect to the second terminal device 120b so as to exchange various types of information or files. A conventional peer-to-peer (P2P) scheme may be used to exchange information or files.

The electronic device 110 according to an embodiment may be a server configured to operate and manage a video collaboration service. For example, the electronic device 110 may be a cloud server configured to operate and manage a video collaboration service. The electronic device 110 may be communicatively connected with the plurality of terminal devices 120 having a program for providing a video collaboration service installed therein, thereby transmitting or receiving various pieces of information and materials. For example, the electronic device 110 may receive an image file from the first terminal device 120a, and may store the received image file. The electronic device 110 may transmit the received image file to the second terminal device 120b.

Although the server configured to operate and manage a video collaboration service is illustrated as a single electronic device 110 in the present disclosure, a single device or a set of more than one devices may constitute the server. The electronic device 110 may be a set of a first server device, a second server device, and a third server device. The first server device may receive an image file divided into a plurality of segments and metadata divided into a plurality of segments from the first terminal device 120a and may store the same. The first server device may identify a related image file, based on information included in the metadata. The second server device may detect at least one edited (or modified) segment among the image file divided into the plurality of segments. The second server device may transmit the at least one edited segment to the second terminal device 120b. The third server device may identify a terminal device having at least one edited segment of the latest version. For example, the third server device may identify that a terminal device having at least one edited segment is the first terminal device 120a. Although it has been assumed in the present embodiment that the electronic device 110 is a set of three server devices, the number of server devices is not limited thereto.

The plurality of terminal devices 120 according to an embodiment may include various types of devices. The plurality of terminal devices 120 may include, for example, a computer device (for example, terminal device 120a in FIG. 1), a laptop (for example, terminal device 120b in FIG. 1), a portable communication device (smartphone) ((for example, terminal device 120c in FIG. 1), a portable multimedia device, a wearable device, or a home appliance. The terminal devices according to an embodiment of the present disclosure are not limited to the above-mentioned devices. The plurality of terminal devices 120 according to various embodiments may be connected to a communication network. The communication network may include, for example, a wired LAN, a wireless LAN (for example, Wi-Fi network), or a WAN. Although it has been assumed in the description with reference to FIG. 1 that the number of terminal devices is three, the number of terminal devices is not limited thereto and may be two, four, or more.

The electronic device 110 may store image files received from the terminal devices 120 and metadata related to the image files. The electronic device 110 may receive an image file divided into the plurality of segments from the terminal devices 120 and, in this case, may store the image file divided into the plurality of segments. The electronic device 110 may receive metadata which is related to the image file, and which is divided into the plurality of segments, from the terminal devices 120 and, in this case, may store the metadata divided into the plurality of segments.

As used herein, "image file" generally refers to moving pictures and for example to a file having an extension of avi, mp4, or mkv. Metadata may be structured data regarding an image file, and may be attribute information describing the image file. Metadata may be data having the same length as the related image file. Metadata may include identification (ID) information regarding the related image file (for example, image file name, attribute information), information regarding the user who has generated the image file, information regarding the user who has edited the image file, the last time at which the image file was edited, and user-added comment information. The user-added comment information may refer to a comment made at a specific timepoint or a specific location of the image file, for example.

The terminal devices 120 may generate various image files (that is, the original image files). The terminal devices 120 may divide an image file into a plurality of segments. The terminal devices 120 may divide an image file into a plurality of segments at a preset time interval. For example, the terminal devices 120 may divide an image file into the plurality of segments at an interval of five seconds.

The terminal devices 120 may generate metadata divided into the plurality of segments.

The metadata divided into the plurality of segments may have one-to-one correspondence with an image file divided into the plurality of segments. For example, if an image file has been divided into 100 image segments in five seconds, the metadata may also be divided into 100 image segments in five seconds. The metadata divided into the plurality of segments may further include information regarding corresponding segments among the plurality of segments of the image file.

The terminal devices 120 may receive image files downloaded or streamed from the electronic device 110. For example, if the second terminal device 120b accesses a specific image file for a video collaboration service, the electronic device 110 may successively transmit the plurality of segments of the image file to the second terminal device 120b, thereby streaming the image file.

Figure 2:
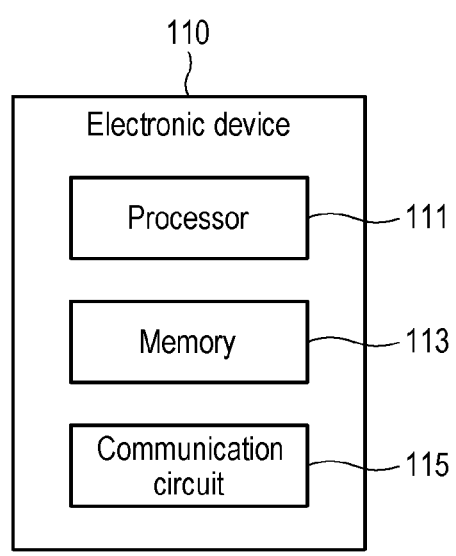
FIG. 2 is a block diagram of an electronic device according to an embodiment of the present disclosure.

FIG. 2 is a block diagram of an electronic device 110 according to an embodiment of the present disclosure. The electronic device 110 according to an embodiment may include one or more processors 111 and/or one or more memories 113. Some of the illustrated components of the electronic device 110 may be omitted or replaced. The expression "processor 111" may denote one processor 111 or a set of more than one processors 111 unless otherwise mentioned explicitly. The expression "memory 113" may denote one memory 113 or a set of more than one memories 113 unless otherwise mentioned explicitly.

The processor 111 may perform operations or data processing related to control and/or communication of respective components of the electronic device 110. The processor 111 may be operatively connected to components of the electronic device 110, for example. The processor 111 may store instructions or data received from another component of the electronic device 110 in the memory 113, may load and process instructions or data stored in the memory 113, and may store result data back in the memory 113. The memory 113 may store instructions related to operations of the processor 111.

The memory 113 may store various pieces of information. The memory 113 may store various image files and pieces of metadata related to the image files. The memory 113 may store an image file divided into the plurality of segments and metadata which is related to the image file, and which is divided into the plurality of segments. The image file divided into the plurality of segments and the metadata related to the image file and divided into the plurality of segments may be received from the terminal devices 120. The memory 113 may store ID information of each of the plurality of terminal devices 120 and the logical address of a communication network to which each of the plurality of terminal devices 120 is connected.

The memory 113 may store information indicating whether each of the plurality of terminal devices 120 is activated.

The logical address may refer to a logical address of a communication network to which the terminal devices 120 are connected. For example, the logical address may be an Internet Protocol (IP) address of the communication network to which the terminal devices 120 are connected. For example, the logical address may be the IP address of a communication device related to the communication network to which the terminal devices 120 are connected. The logical address may be a serial number used to identify the communication network to which the terminal devices 120 are connected (belong). The communication device may be a router or an access point, for example. As used herein, the logical address of a terminal device 120 may refer to the logical address (for example, an IP address) of a communication network to which the terminal device 120 is connected. The expression "the logical address of a terminal device" may be used interchangeably with "the logical address related to a terminal device."

According to an embodiment, the electronic device 110 may further include a communication circuit 115. The communication circuit 115 may establish a communication channel with an external device (for example, a terminal device 120) and may transmit or receive various data with the external device. According to various embodiments, the communication circuit 115 may include a cellular communication module so as to be connected to a cellular network (for example, 3G, LTE, 5G, Wibro, or Wimax). According to various embodiments, the communication circuit 115 may include a short-range communication module so as to transmit or receive data with the external device by using short-range communication (for example, Wi-Fi, Bluetooth, Bluetooth Low Energy (BLE), UWB (Ultra Wide Band)), but is not limited thereto.

Figure 3:
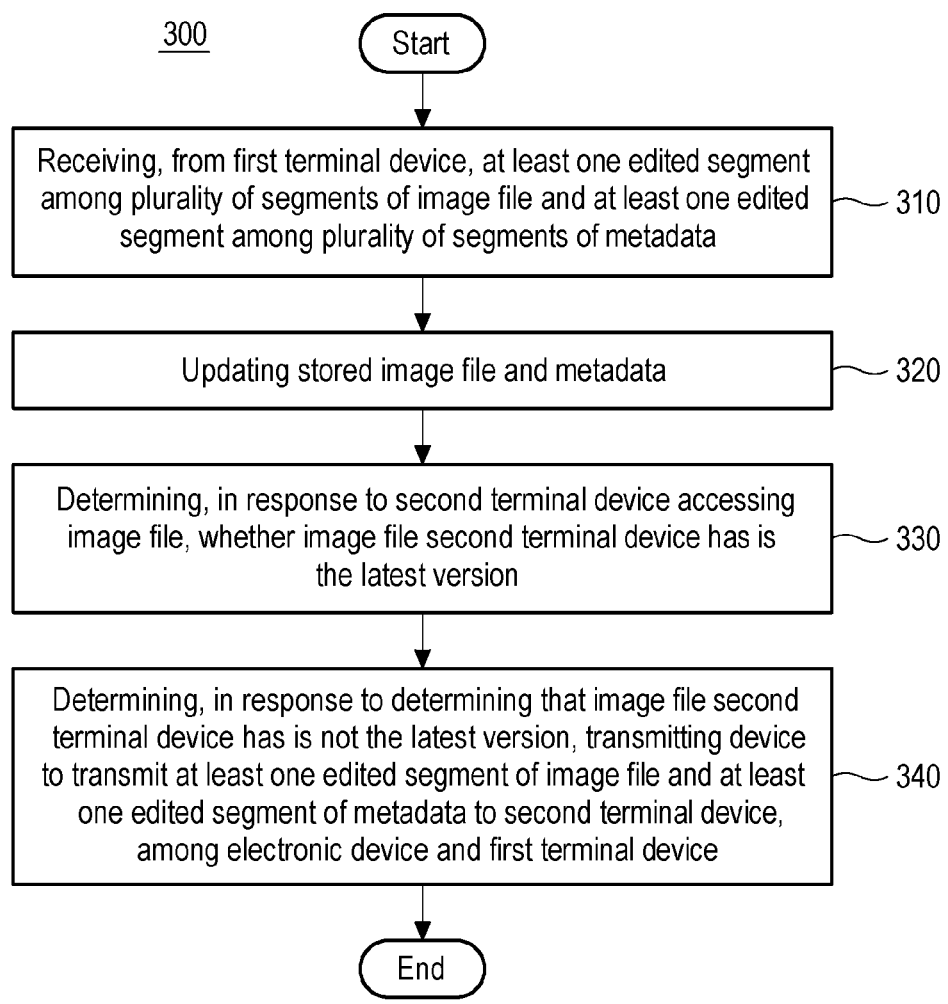
FIG. 3 is a flowchart illustrating operations of an electronic device according to an embodiment of the present disclosure.

FIG. 3 is a flowchart 300 illustrating operations of an electronic device 110 according to various embodiments of the present disclosure. It will be assumed in the following description with reference to FIG. 3 that each of the electronic device 110, the first terminal device 120a, and the second terminal device 120b has an image file divided into a plurality of segments and metadata which is related to the image file, and which is divided into a plurality of segments, prestored therein.

The first terminal device 120a may generate an image file and may divide the generated image file into a plurality of segments at a preset time interval. The first terminal device 120a may generate metadata which is related to the image file, and which is divided into a plurality of segments. The first terminal device 120a may transmit the image file divided into the plurality of segments and the metadata divided into the plurality of segments to the electronic device 110. The electronic device 110 may store the image file divided into the plurality of segments and the metadata divided into the plurality of segments in the memory 113. At the request of the second terminal device 120b, the electronic device 110 may transmit the image file divided into the plurality of segments and the metadata divided into the plurality of segments to the second terminal device 120b.

The processor 111 of the electronic device 110 according to various embodiments may receive, in operation 310, at least one edited segment among the plurality of segments of an image file and at least one edited segment among the plurality of segments of metadata from the first terminal device 120a. For example, the first terminal device 120a may edit (or modify) a specific part of an image file. In this case, at least one segment corresponding to some of the plurality of segments included in the image file may be solely edited (modified). The first terminal device 120a may identify at least one edited segment among the plurality of segments included in the image file. As used herein, "at least one edited segment among the plurality of segments of an image file" may refer to a segment of the image file of the latest version, which has been modified most recently, and "at least one edited segment among the plurality of segments of metadata" may refer to a segment of the metadata of the latest version, which has been modified most recently.

It will be assumed, for example, that an image file was divided into ten image segments in five seconds, and the user of the first terminal device 120a edited a part ranging from third to seventh seconds. In this case, the first and second segments of the ten image segments are edited. The first terminal device 120a may identify that the at least one edited segment among the image file divided into ten segments corresponds to the first and second segments. In this case, the first and second segments of the metadata divided into ten segments are edited as well. The first terminal device 120a may identify that the at least one edited segment among the metadata di vided into ten segments corresponds to the first and second segments. The first terminal device 120a may then transmit the first and second segments among the plurality of segments of the image file to the electronic device 110. The first terminal device 120a may transmit the first and second segments among the plurality of segments of the metadata to the electronic device 110.

The processor 111 according to various embodiments may update, in operation 320, the image file divided into the plurality of segments and the metadata divided into the plurality of segments, stored in the memory 113. The processor 111 may update the image file and the metadata stored in the memory 113, based on at least one edited segment of the image file and at least one edited segment of the metadata. For example, in the above-mentioned case, only the first and second segments among the ten segments included in the image file and the metadata have been received from the first terminal device 120a, and the processor 111 may thus replace the existing first and second segments included in the image file and the metadata with the newly received segments.

The processor 111 according to various embodiments may determine, in operation 330, whether the image file the second terminal device 120b has is the latest version, in response to the second terminal device 120b accessing the image file. The processor 111 may identify metadata related to the image file the second terminal device 120b has, thereby determining whether the image file the second terminal device 120b has is the latest version. The processor 111 may determine that the image file and the metadata, including at least one edited segment of the image file and at least one edited segment of the metadata received from the first terminal device 120a, are the latest version. That is, the processor 111 may determine that the image file and the metadata, not including at least one edited segment of the image file and at least one edited segment of the metadata, are not the latest version.

For example, the second terminal device 120b has failed to receive at least one edited segment of the image file and at least one edited segment of the metadata from the electronic device 110 or the first terminal 120a, and the image file the second terminal device 120b has is thus not the latest version. In this case, information regarding the time at which the last editing occurred, included in the metadata related to the image file the second terminal device 120b has, may be identified, thereby determining whether the image file the second terminal device 120b has is the latest version. That is, in this case, the processor 111 may determine that the image file the second terminal device 120b has is not the latest version, based on the image file and metadata the second terminal device 120b have.

If the image file the second terminal device 120b has is the latest version, the processor 111 may determine that there is no need to transmit at least one edited segment of the image file and at least one edited segment of the metadata to the second terminal device 120b.

In response to the image file the second terminal device 120b has is not the latest version, the processor 111 according to various embodiments may determine, in operation 340, transmitting device to transmit at least one edited segment of the image file and at least one edited segment of the metadata to the second terminal device 120b, among the electronic device 110 and the first terminal device 120a. If the image file the second terminal device 120b has is not the latest version, at least one edited segment of the image file and at least one edited segment of the metadata a re preferably transmitted to the second terminal device 120b, in order to update the image file an d metadata of the second terminal device 120b to the latest version. In the above-mentioned case it is the electronic device 110 and the first terminal device 120a that have the image file and metadata of the latest version, and the electronic device 110 or the first terminal device 120a may thus transmit at least one edited segment of the image file and at least one edited segment of the metadata to the second terminal device 120b.

If the electronic device 110 unilaterally transmits at least one edited segment of the image file and at least one edited segment of the metadata to the second terminal device 120b, a large amount of traffic may occur in the electronic device 110. Therefore, it may be preferable in a specific condition that, instead of the electronic device 110, the first terminal device 120a transmits at least one edited segment of the image file and at least one edited segment of the metadata to the second terminal device 120b. In this case, the first terminal device 120a may use P2P technology so as to transmit at least one edited segment of the image file and at least one edited segment of the metadata to the second terminal device 120b. Details of the above-mentioned specific condition will be described later.

According to an embodiment of the present disclosure, if the first terminal device 120a edited an image file, the electronic device 110 may receive at least one edited segment among the plurality of segments of the image file and at least one edited segment among the plurality of segments of the metadata from the first terminal device 120a, and may update the image file and metadata stored in the memory 113. In response to the second terminal device 120b accessing the image file, the electronic device 110 may determine whether the image file the second terminal device 120b has is the latest version. In response to determining that the image file the second terminal device 120b has is not the latest version, the electronic device 110 may determine which one of the electronic device 110 and the first terminal device 120a is to transmit at least one edited segment of the image file and at least one edited segment of the metadata to the second terminal device 120b. According to the present embodiment, only the segment of the image file and the segment of the metadata, which correspond to the edited part, are uploaded to the electronic device 110, thereby effectively reducing traffic occurring if the image file is uploaded. In addition, the transmitting device to transmit at least one edited segment of the image file and at least one edited segment of the metadata to the second terminal device 120b can be changed, thereby efficiently managing the amount of traffic occurring at the server end.

FIG. 4 illustrates a method of managing a video collaboration service according to an embodiment of the present disclosure. Although it will be assumed in the following description with reference to FIG. 4 that three terminal devices 120a, 120b, and 120c use a video collaboration service, the number of terminal devices 120 is not limited thereto, and may be two, four, or more.

The first terminal device 120a according to various embodiments may generate an image file "X" 410. The first terminal device 120a may divide the image file 400 into the plurality of segments. The image file "X_divided" 410a divided into the plurality of segments may be stored in the first terminal device 120a. The first terminal device 120a may generate metadata "X_meta" 420a which is related to the image file 410a divided into the plurality of segments, and which is divided into the plurality of segments. The metadata 420a divided into the plurality of segments may have one-to-one correspondence with the image file divided into the plurality of segments. For example, if the image file has been divided into 100 segments, metadata divided into 100 segments may be generated. Respective segments of the metadata may have one-to-one correspondence with respective segments of the image file.

The first terminal device 120a according to various embodiments may transmit the image file 410a divided into the plurality of segments and the metadata 420a divided into the plurality of segments to the electronic device 110. The electronic device 110 may store the image file 410 and the metadata 420 received from the first terminal device 120a. The image file 410 and the metadata 420 stored in the electronic device 110 may have been divided into the plurality of segments.

The electronic device 110 according to various embodiments may transmit the image file s 410b and 410c divided into the plurality of segments and the metadata 420b and 420c divided into the plurality of segments to the second terminal device 120b and/or the third terminal device 120c. According to an embodiment, the electronic device 110 may transmit the image files 410b and 410c divided into the plurality of segments and the metadata 420b and 420c divided into the plurality of segments if the second terminal device 120b and/or the third terminal device 120c are activated. The description "if the second terminal device 120b and/or the third terminal device 120c are activated" may mean, for example, "if power is on", "if a program for providing a video collaboration service is executed", or "if access to the corresponding image file is requested."

According to another embodiment, the second terminal device 120b and/or the third terminal device 120c may receive the image files 410b and 410c divided into the plurality of segments and the metadata 420b and 420c divided into the plurality of segments from the first terminal dev ice 120a. In this case, the first terminal device 120a may use P2P technology to connect to the second terminal device 120b and to transmit the image files 410b and 410c divided into the plurality of segments and the metadata 420b and 420c divided into the plurality of segments. The specific condition under which the first terminal device 120a transmits the image file divided into the plurality of segments and the metadata divided into the plurality of segments to the second terminal device 120b and/or the third terminal device 120c may be described later.

FIG. 5A and FIG. 5B illustrate a method of managing a video collaboration service according to an embodiment of the present disclosure. Particularly, FIG. 5A and FIG. 5B illustrate a method of managing a video collaboration service if an image file has been edited in the first terminal device 120a.

Referring to FIG. 5A, the first terminal device 120a according to various embodiments may edit (or modify) at least one segment 510a among the image divided into the plurality of segments. For example, as in FIG. 5A, at least one segment 510a shaded, among the image file divided into the plurality of segments "X_divided" 410a, may be solely edited. In this case, at least one segment 520a among the metadata divided into the plurality of segments "X_meta" 420a, which corresponds to the at least one edited segment 510a of the image file, may be edited (or modified) together.

The first terminal device 120a according to various embodiments may transmit (that is, upload) the at least one edited segment 510a of the image file and the at least one edited segment 520a of the metadata to the electronic device 110. That is, if the image file has been edited, the first terminal device 120a does not transmit the entire edited image file to the electronic device 110, but transmits at least one segment actually edited to the electronic device 110, thereby effectively reducing the traffic.

The electronic device 110 according to various embodiments may update the image file 410 and the metadata 420 stored in the memory 113, based on the at least one edited segment of the image file and the at least one edited segment of the metadata received from the first terminal device 120a. The processor 111 of the electronic device 110 may replace existing segments, among the plurality of segments included in the image file 410, with at least one edited segment 510, thereby updating the image file 410 to the latest version. In a similar manner, existing segments among the plurality of segments included in the metadata 420 may be replaced with at least one edited segment 520, thereby updating the metadata 420 to the latest version.

It will be assumed in the following description with reference to FIG. 5B that the second terminal device 120b is in an activated state, and the third terminal device 120c is in a deactivated state, for convenience of description.

The second terminal device 120b according to various embodiments may receive at least one edited segment of the image file and at least one edited segment of the metadata from the electronic device 110 or the first terminal device 120a. The user of the second terminal device 120b may access the image file 410 through a program that provides a video collaboration service. In this case, the second terminal device 120b may transmit a request for access to the image file 410 to the electronic device 110.

In response to the second terminal device 120b accessing the image file 410, the electronic device 110 may identify whether the image file 410a the second terminal device 120b has is the latest version. The electronic device 110 may determine whether the image file 410a the second terminal device 120b has is the latest version, based on the metadata 420b related to the image fil e 410a the second terminal device 120b has. If the image file 410a and the metadata 420b the second terminal device 120b have do not include at least one segment edited by the first terminal device 120a, it may be determined that the image file 410a the second terminal device 120b has is not the latest version. In this case, the electronic device 110 may determine that the image file and metadata of the latest version are to be transmitted to the second terminal device 120b.

In response to the determination that the image file 410a the second terminal device 120b has is not the latest version, the electronic device 110 according to various embodiments may determine which one of the electronic device 110 and the first terminal device 120a is to transmit at least one edited segment of the image file and at least one edited segment of the metadata to the second terminal device 120b. For example, the electronic device 110 and the first terminal device 120a currently have at least one edited segment (that is, the latest segment) of the image file and metadata, the electronic device 110 may determine the transmitting device to transmit at least one edited segment of the image file and at least one edited segment of the metadata, among the electronic device 110 and the first terminal device 120a.

The electronic device 110 may determine the transmitting device, based on information indicating whether the first terminal device 120a is activated, the logical address of the communication network to which the first terminal device 120a is connected, and the logical address of the communication network to which the second terminal device 120b is connected.

According to an embodiment, the electronic device 110 may determine that the transmitting device is the electronic device 110 if the first terminal device 120a is deactivated. In this case, the electronic device 110 may transmit at least one edited segment 510 of the image file and at least one edited segment 520 of the metadata to the second terminal device 120b (transmission (A) route in FIG. 5B). The information indicating whether the first terminal device 120a is activated may be information indicating whether the first terminal device 120a is powered on, for example. The information indicating whether the first terminal device 120a is activated may be information indicating whether a program that provides a video collaboration service is executed in the first terminal device 120a, for example.

According to an embodiment, if the first terminal device 120a is activated, and if the logical address of the communication network to which the first terminal device 120a is connected is identical to the logical address of the communication network to which the second terminal device 120b is connected, the electronic device 110 may determine that the transmitting device is the first terminal device 120a. In this case, the electronic device 110 may transmit an instruction to the first terminal device 120a to instruct the same to transmit at least one modified segment of the image file and at least one modified segment of the metadata to the second terminal device 120b. In response to receiving the instruction, the first terminal device 120a may transmit at least one modified segment 510a of the image file and at least one modified segment 520a of the metadata to the second terminal device 120b (transmission (B) route in FIG. 5B). The logical address of the first terminal device 120a and that of the second terminal device 120b may be, for example, IP addresses. In this case, the electronic device 110 may determine that it is most efficient for the first terminal device 120a to transmit edited segments, and the first terminal device 120a may thus directly transmit edited segments to the second terminal device 120b by using P2P technology. In this case, the traffic occurring in the electronic device 110, which corresponds to the server end of the system 10, may be reduced.

According to an embodiment, if the logical address of the communication network to which the first terminal device 120a is connected is identical to the logical address of the communication network to which the second terminal device 120b is connected, although the first terminal device 120a is activated, the electronic device 110 may determine that the transmitting device is the electronic device 110. The electronic device 110 may transmit at least one edited segment 510 of the image file and at least one edited segment 520 of the metadata to the second terminal device 120b (transmission (A) route in FIG. 5B).

In response to receiving at least one edited segment 510 of the image file and at least one edited segment 520 of the metadata from the electronic device 110 or the first terminal device 120a, the second terminal device 120b according to various embodiments may update the pre-stored image file 410b and metadata 420b. In this case, the image file 410b stored in the second terminal device 120b may include at least one edited segment 510b, and the metadata 420b stored in the second terminal device 120b may include at least one edited segment 520b.

The third terminal device 120c according to various embodiments is deactivated and thus cannot update the image file and metadata to the latest version. That is, the electronic device 110 may not transmit at least one edited segment of the image file and at least one edited segment of the metadata to the third terminal device 120c in a deactivated state. If the third terminal device 120c is activated thereafter, the electronic device 110 or the first terminal device 120a may transmit at least one edited segment of the image file and at least one edited segment of the metadata to the third terminal device 120c.

Figure 6:
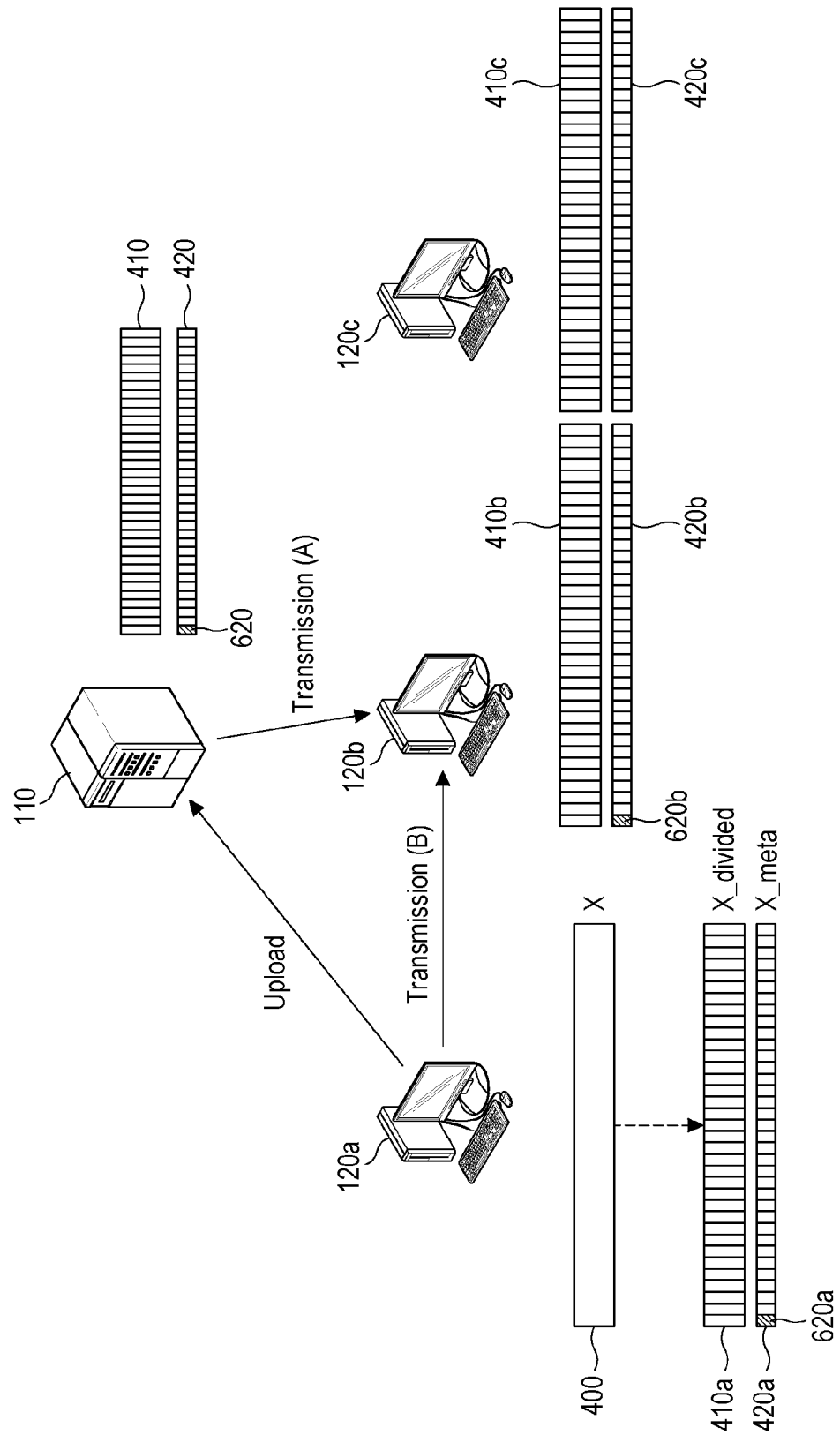
FIG. 6 illustrates a method of managing a video collaboration service according to an embodiment of the present disclosure.

FIG. 6 illustrates a method of managing a video collaboration service according to an embodiment of the present disclosure. Particularly, FIG. 6 illustrates a method of managing a video collaboration service if the first terminal device 120a has edited (or modified) metadata only. The same descriptions made with reference to FIG. 4, FIG. 5A, and FIG. 5B will not be repeated herein. In addition, it will be assumed in the following description with reference to FIG. 6 that the second terminal device 120b is activated, and the third terminal device 120c is deactivated, for convenience of description.

Referring to FIG. 6, the user of the first terminal device 120a according to various embodiments may edit (or modify) only metadata. For example, if the user of the first terminal device 120a adds a comment to an image file, the image file may not be edited, and metadata related to the image file may be solely edited.

The first terminal device 120a according to various embodiments may solely transmit at least one edited segment 620a of the metadata to the electronic device 110. That is, instead of transmitting the entire metadata 420a of the latest version to the electronic device 110, the first terminal device 120a may only transmit at least one edited segment to the electronic device 110. In this case, the image file 410a has not been edited, and the first terminal device 120a may thus not transmit the image file 410a to the electronic device 110.

Identical to the method described with reference to FIG. 5A and FIG. 5B, the electronic device 110 according to various embodiments may update metadata 420 stored in the memory 113 by using at least one edited segment of metadata received from the first terminal device 120a. The updated metadata 420 includes at least one edited segment 620.

Identical to the method described with reference to FIG. 5A and FIG. 5B, the second terminal device 120b according to various embodiments may receive at least one edited segment of metadata from the electronic device 110 or the first terminal device 120a. Therefore, the second terminal device 120b may have metadata 420b of the latest version including at least one edited segment 620b.

The third terminal device 120c according to various embodiments is deactivated and thus may be unable to receive at least one edited segment of metadata from the electronic device 110 or the first terminal device 120a. Therefore, the third terminal device 120c has metadata 420c of an older version.

FIG. 7A and FIG. 7B are flowcharts 700 illustrating operations of a system according to an embodiment of the present disclosure.

Referring to a flowchart 700 illustrating operations, the first terminal device 120a according to various embodiments may generate an image file in operation 701.

The first terminal device 120a according to various embodiments may divide the image file into the plurality of segments in operation 703. The image file divided into the plurality of segments may be an image file divided into the plurality of segments at a preset time interval (for example, five seconds).

The first terminal device 120a according to various embodiments may generate metadata divided into the plurality of segments in operation 705. The first terminal device 120a according to various embodiments may transmit the image file divided into the plurality of segments and the metadata divided into the plurality of segments in operation 707.

The electronic device 110 according to various embodiments may store the image file divided into the plurality of segments and the metadata divided into the plurality of segments in the memory 113 in operation 709.

The electronic device 110 according to various embodiments may transmit the image file divided into the plurality of segments and the metadata divided into the plurality of segments to the second terminal device 120b and the third terminal device 120c in operation 711. At this point of time, each of the second terminal device 120b and the third terminal device 120c may be in an activated state. For example, a program for providing a video collaboration service may be activated in each of the second terminal device 120b and the third terminal device 120c (operation 702).

The first terminal device 120a according to various embodiments may edit at least one segment among the plurality of segments of the image file and may edit at least one segment among the plurality of segments of the metadata in operation 713.

The first terminal device 120a according to various embodiments may transmit at least one edited segment among the plurality of segments of the image file and at least one edited segment among the plurality of segments of the metadata to the electronic device 110 in operation 715.

The electronic device 110 according to various embodiments may update the image file and metadata prestored in the memory 113 in operation 717. For example, the electronic device 110 may update the image file and metadata prestored in the memory 113, based on at least one edited segment of the image file and at least one edited segment of the metadata. That is, at this point of time, the electronic device 110 and the first terminal device 120a have the latest version of the image file and metadata.

The second terminal device 120b according to various embodiments may access the image file in operation 719. For example, the second terminal device 120b may connect to the electronic device 110 through a program for providing a video collaboration service, and may access the image file in order to view and edit the image file stored in the electronic device 110. In this case, the second terminal device 120b may transmit a request for access to the image file to the electronic device 110.

The electronic device 110 according to various embodiments may determine whether the image file the second terminal device 120b has is the latest version in operation 721. The electronic device 110 may identify whether the image file the second terminal device 120b has is the latest version by using metadata related to the image file the second terminal device 120b has. The electronic device 110 may have information regarding the metadata related to the image file the second terminal device 120b has stored in the memory 113, or may request the second terminal device 120b to provide the metadata related to the image file the second terminal device 120b has.

The electronic device 110 according to various embodiments may determine the transmitting device to transmit at least one edited segment of the image file and at least one edited segment of the metadata to the second terminal device 120b in operation 723. The electronic device 110 may determine the transmitting device to transmit segments of the latest version to the second terminal device 120b among the electronic device 110 and the first terminal device 120a.

The electronic device 110 or the first terminal device 120a according to various embodiments may transmit at least one edited segment of the image file and at least one edited segment of the metadata to the second terminal device 120b in operation 725. If the electronic device 110 is determined as the transmitting device, the electronic device 110 may transmit at least one edited segment of the image file and at least one edited segment of the metadata to the second terminal device 120b. If the first terminal device 120a is determined as the transmitting device, the electronic device 110 may transmit an instruction to the first terminal device 120a to instruct the same to transmit at least one edited segment of the image file and at least one edited segment of the metadata to the second terminal device 120b.

For example, the third terminal device 120c is deactivated in operation 714 in FIG. 7A, and the electronic device 110 may not transmit segments of the latest version to the third terminal device 120c. For example, the program for providing a video collaboration service is deactivated in the third terminal device 120c, the electronic device 110 may determine not to transmit at least one edited segment of the image file and at least one edited segment of the metadata to the third terminal device.

FIG. 8 is a flowchart 800 illustrating operations of an electronic device 110 according to an embodiment of the present disclosure.

Referring to the flowchart 800 illustrating operations, the processor 111 of the electronic device 110 according to various embodiments may receive at least one edited segment among the plurality of segments of an image file and at least one edited segment among the plurality of segments of metadata from the first terminal device 120a in operation 810.

The processor 111 according to various embodiments may update the image file and metadata prestored in the memory 113, based on at least one edited segment of the image file and at least one edited segment of the metadata, in operation 820.

In response to the second terminal 120b accessing the image file, the processor 111 according to various embodiments may determine whether the image file the second terminal device 120b has is the latest version in operation 830. For example, the processor 111 of the electronic device 110 may determine whether the image file the second terminal device 120b has is the latest version by using metadata related to the image the second terminal device 120b has.

If the image file the second terminal device 120b has is the latest version (Yes in operation 840), the processor 111 may determine that there is no need to transmit at least one edited segment of the image file and at least one edited segment of the metadata to the second terminal device 120b.

If the image file the second terminal device 120b has is not the latest version ("No" in operation 840), the processor 111 may proceed to operation 850 and determine whether the first terminal device 120a is activated.

If the first terminal device 120a is deactivated ("No" in operation 850), the processor 111 may proceed to operation 870 and determine that the transmitting device to transmit segments of the latest version to the second terminal 120b is the electronic device 110. In this case, the processor 111 may transmit at least one edited segment of the image file and at least one edited segment of the metadata to the second terminal device 120b. In response to receiving segments of the latest version, the second terminal device may update the image file and metadata the device have thereby to the latest version.

If the first terminal device 120a is activated ("Yes" in operation 850), the processor 111 may proceed to operation 860 and determine whether the logical address of the first terminal device 120a is identical to that of the second terminal device 120b. The processor 111 may determine whether the logical address of the communication network to which the first terminal device 120a is connected is identical to the logical address of the communication network to which the second terminal device 120b is connected.

If the logical address of the first terminal device 120a is identical to that of the second terminal device 120b ("Yes" in operation 860), the processor 111 may proceed to operation 880 and determine that the transmitting device to transmit segments of the latest version to the second terminal device 120b is the first terminal device 120a. The processor 111 may transmit an instruction to the first terminal device 120a to instruct the same to transmit at least one edited segment of the image file and at least one edited segment of the metadata to the second terminal device 120b. In response to receiving the instruction, the first terminal device 120a may transmit at least one edited segment of the image file and at least one edited segment of the metadata to the second terminal device 120b.

If the logical address of the first terminal device 120a is different from that of the second terminal device 120b ("No" in operation 860), the processor 111 may proceed to operation 870 and determine that the transmitting device to transmit segments of the latest version to the second terminal device 120b is the electronic device 110. In this case, the processor 111 may transmit at least one edited segment of the image file and at least one edited segment of the metadata to the second terminal device 120b. In response to receiving segments of the latest version, the second terminal device 120b may update the image file and metadata the device have thereby to the latest version.

According to the present embodiment, the transmitting device may be determined, based on information indicating whether the first terminal device 120a is activate, the logical address of the communication network to which the first terminal device 120a is connected, and the logical address of the communication network to which the second terminal device 120b is connected. Therefore, traffic occurring in the server stage can be effectively reduced by determining the transmitting device by using simple references.

Although process steps, method steps, algorithms, and the like have been described in a successive order in the flowcharts illustrated in FIG. 3, FIG. 7a, FIG. 7b, and FIG. 8, such process steps, method steps, and algorithms may be configured so as to operate in any appropriate order. In other words, steps of processes, methods, and algorithms described in various embodiments of the present disclosure are not necessary performed in the order described in the present disclosure. In addition, although some steps are described as being performed asynchronously, such steps may be performed synchronously in other embodiments. In addition, an exemplary process illustrated in the diagrams does not mean that other changes and modifications thereof are excluded, does not mean that the exemplary process or any of the steps thereof is essential to one or more among various embodiments of the present disclosure, and does not mean that the exemplary process is preferred.

While the foregoing methods have been described with respect to particular embodiments, these methods may also be implemented as computer-readable codes on a computer-readable recording medium. The computer-readable recoding medium includes any kind of data storage devices that can be read by a computer system. Examples of the computer-readable recording medium includes ROM, RAM, CD-ROM, magnetic tape, floppy disk, optical data storage device and the like. Also, the computer-readable recoding medium can be distributed to the computer systems which are connected through a network so that the computer-readable codes can be stored and executed in a distribution manner. Further, the functional programs, codes, and code segments for implementing the foregoing embodiments can easily be inferred by programmers in the art to which the present disclosure pertains.

Hereinafter, various embodiments of the present disclosure will be described additionally.

[Additional Description 1]

An electronic device including:
  a communication circuit communicatively connected with
    a plurality of terminal devices;
  one or more memories configured to store an image file
    divided into a plurality of segments and metadata
    related to the image file and divided into a plurality of
    segments; and
  one or more processors,
  wherein the one or more processors are configured to:
  receive, from a first terminal device, at least one edited
    segment among the plurality of segments of the image
    file and at least one edited segment among the plurality
    of segments of the metadata;

update the image file and the metadata stored in the one or more memories, based on the at least one edited segment of the image file and the at least one edited segment of the metadata;

determine, in response to a second terminal device accessing the image file, whether an image file the second terminal device has is the latest version; and determine, in response to determining that the image file the second terminal device has is not the latest version, a transmitting device to transmit the at least one edited segment of the image file and the at least one edited segment of the metadata to the second terminal device, among the electronic device and the first terminal device.

[Additional Description 2]

The electronic device of Additional description 1, wherein the one or more processors are configured to determine the transmitting device, based on information indicating whether the first terminal device is activated, a logical address of a communication network to which the first terminal device is connected, and a logical address of a communication network to which the second terminal device is connected.

[Additional Description 3]

The electronic device of Additional description 2, wherein the one or more processors are configured to:

determine that the transmitting device is the first terminal device if the first terminal device is activated, and if the logical address of the communication network to which the first terminal device is connected is identical to the logical address of the communication network to which the second terminal device is connected; and transmit an instruction to the first terminal device instructing the first terminal device to transmit the at least one edited segment of the image file and the at least one edited segment of the metadata to the second terminal device.

[Additional Description 4]

The electronic device of Additional description 2, wherein the one or more processors are configured to determine that the transmitting device is the electronic device if the first terminal device is deactivated, or if the logical address of the communication network to which the first terminal device is connected is different from the logical address of the communication network to which the second terminal device is connected, and transmit the at least one edited segment of the image file and the at least one edited segment of the metadata to the second terminal device.

[Additional Description 5]

The electronic device of one of Additional descriptions 1 to 4, wherein the one or more processors are configured to receive the image file divided into the plurality of segments and the metadata related to the image file and divided into the plurality of segments from the first terminal device and to store the received image file and the received metadata in the one or memories.

[Additional Description 6]

The electronic device of one of Additional descriptions 1 to 5, wherein the image file divided into the plurality of segments is an image file divided into the plurality of segments at a preset time interval.

[Additional Description 7]

The electronic device of one of Additional description 6, wherein the plurality of segments included in the metadata have one-to-one correspondence with the plurality of segments included in the image file.

[Additional Description 8]

The electronic device of one of Additional descriptions 1 to 7, wherein the metadata divided into the plurality of segments includes ID information regarding the related image file, information regarding a user who has generated the image file, information regarding a user who has edited the image file, the time at which last editing occurred, information regarding corresponding segments among the plurality of segments of the image file, and user-added comment information.

[Additional Description 9]

The electronic device of Additional description 2, wherein the information indicating whether the first terminal device is activated is information indicating whether the first terminal device is powered on.

[Additional Description 10]

The electronic device of Additional description 2, wherein the information indicating whether the first terminal device is activated is information indicating whether a program for providing a video collaboration service is being executed in the first terminal device.

[Additional Description 11]

The electronic device of one of Additional descriptions 1 to 10, wherein the one or more processors are configured to determine whether the image file the second terminal device has is the latest version, based on the updated metadata and metadata related to the image file the second terminal device has.

[Additional Description 12]

The electronic device of Additional description 2, wherein the logical address is an Internet Protocol (IP) address.

[Additional Description 13]

The electronic device of one of Additional descriptions 1 to 12, wherein the one or more processors are configured to solely update, if a different edited segment among the plurality of segments of the metadata is further received from the first terminal device, the metadata stored in the one or more memories based on the different edited segment of the metadata.

[Additional Description 14]

A method including:

receiving, from a first terminal device, at least one edited segment among a plurality of segments of an image file and at least one edited segment among a plurality of segments of metadata, an image file divided into the plurality of segments and metadata related to the image file and divided into the plurality of segments being stored in one or more memories of an electronic device;

updating the image file and the metadata stored in the one or more memories, based on the at least one edited segment of the image file and the at least one edited segment of the metadata;

determining, in response to a second terminal device accessing the image file, whether an image file the second terminal device has is the latest version; and determining, in response to determining that the image file the second terminal device has is not the latest version, a transmitting device to transmit the at least one edited segment of the image file and the at least one edited segment of the metadata to the second terminal device, among the electronic device and the first terminal device.

[Additional Description 15]

A non-transitory computer-readable recording medium in which a program to be executed by a computer is recorded, the program including executable instructions which, when executed by one or more processors, cause the one or more processors to perform:

receiving, from a first terminal device, at least one edited segment among a plurality of segments of an image file and at least one edited segment among a plurality of segments of metadata, an image file divided into a plurality of segments and metadata related to the image file and divided into the plurality of segments being stored in one or more memories of an electronic device;

updating the image file and the metadata stored in the one or more memories, based on the at least one edited segment of the image file and the at least one edited segment of the metadata;

determining, in response to a terminal device accessing the image file, whether an image file the second terminal device has is the latest version; and determining, in response to determining that the image file the second terminal device has is not of the latest version, a transmitting device to transmit the at least one edited segment of the image file and the at least one edited segment of the metadata to the second terminal device, among the electronic device and the first terminal device.

Although the technical spirit of the present disclosure has been described by the examples described in some embodiments and illustrated in the accompanying drawings, it should be noted that various substitutions, modifications, and changes can be made without departing from the scope of the present disclosure which can be understood by those skilled in the art to which the present disclosure pertains. In addition, it should be noted that that such substitutions, modifications, and changes are intended to fall within the scope of the appended claims.

What is claimed is:

1. An electronic device comprising:
   a communication circuit communicatively connected with a plurality of terminal devices;
   one or more memories configured to store an image file divided into a plurality of segments and metadata related to the image file and divided into a plurality of segments; and
   one or more processors,
   wherein the one or more processors are configured to:
   receive, from a first terminal device, at least one edited segment among the plurality of segments of the image file and at least one edited segment among the plurality of segments of the metadata;
   update the image file and the metadata stored in the one or more memories, based on the at least one edited segment of the image file and the at least one edited segment of the metadata;
   determine, in response to a second terminal device accessing the image file, whether an image file the second terminal device has is the latest version; and
   determine, in response to determining that the image file the second terminal device has is not the latest version, a transmitting device to transmit the at least one edited segment of the image file and the at least one edited segment of the metadata to the second terminal device, among the electronic device and the first terminal device.

2. The electronic device of claim 1, wherein the one or more processors are configured to determine the transmitting device, based on information indicating whether the first terminal device is activated, a logical address of a communication network to which the first terminal device is connected, and a logical address of a communication network to which the second terminal device is connected.

3. The electronic device of claim 2, wherein the one or more processors are configured to:
   determine that the transmitting device is the first terminal device if the first terminal device is activated, and if the logical address of the communication network to which the first terminal device is connected is identical to the logical address of the communication network to which the second terminal device is connected; and
   transmit an instruction to the first terminal device instructing the first terminal device to transmit the at least one edited segment of the image file and the at least one edited segment of the metadata to the second terminal device.

4. The electronic device of claim 2, wherein the one or more processors are configured to
   determine that the transmitting device is the electronic device if the first terminal device is deactivated, or if the logical address of the communication network to which the first terminal device is connected is different from the logical address of the communication network to which the second terminal device is connected; and
   transmit the at least one edited segment of the image file and the at least one edited segment of the metadata to the second terminal device.

5. The electronic device of claim 1, wherein the one or more processors are configured to receive the image file divided into the plurality of segments and the metadata related to the image file and divided into the plurality of segments from the first terminal device and to store the received image file and the received metadata in the one or memories.

6. The electronic device of claim 1, wherein the image file divided into the plurality of segments is an image file divided into the plurality of segments at a preset time interval.

7. The electronic device of claim 6, wherein the plurality of segments included in the metadata have one-to-one correspondence with the plurality of segments included in the image file.

8. The electronic device of claim 6, wherein the metadata divided into the plurality of segments includes identification (ID) information regarding the related image file, information regarding a user who has generated the image file, information regarding a user who has edited the image file, the time at which last editing occurred, information regarding corresponding segments among the plurality of segments of the image file, and user-added comment information.

9. The electronic device of claim 2, wherein the information indicating whether the first terminal device is activated is information indicating whether the first terminal device is powered on.

10. The electronic device of claim 2, wherein the information indicating whether the first terminal device is activated is information indicating whether a program for providing a video collaboration service is being executed in the first terminal device.

11. The electronic device of claim 1, wherein the one or more processors are configured to determine whether the image file the second terminal device has is the latest version, based on the updated metadata and metadata related to the image file the second terminal device has.

12. The electronic device of claim 2, wherein the logical address is an Internet Protocol (IP) address.

13. The electronic device of claim 1, wherein the one or more processors are configured to solely update, if a different edited segment among the plurality of segments of the metadata is further received from the first terminal device, the metadata stored in the one or more memories based on the different edited segment of the metadata.

14. A method comprising:
   receiving, from a first terminal device, at least one edited segment among a plurality of segments of an image file and at least one edited segment among a plurality of segments of metadata, an image file divided into the plurality of segments and metadata related to the image file and divided into the plurality of segments being stored in one or more memories of an electronic device;
   updating the image file and the metadata stored in the one or more memories, based on the at least one edited segment of the image file and the at least one edited segment of the metadata;
   determining, in response to a second terminal device accessing the image file, whether an image file the second terminal device has is the latest version; and
   determining, in response to determining that the image file the second terminal device has is not the latest version, a transmitting device to transmit the at least one edited segment of the image file and the at least one edited segment of the metadata to the second terminal device, among the electronic device and the first terminal device.

15. A non-transitory computer-readable recording medium in which a program to be executed by a computer is recorded, the program comprising executable instructions which, when executed by one or more processors, cause the one or more processors to perform:
   receiving, from a first terminal device, at least one edited segment among a plurality of segments of an image file and at least one edited segment among a plurality of segments of metadata, an image file divided into the plurality of segments and metadata related to the image file and divided into the plurality of segments being stored in one or more memories of an electronic device;
   updating the image file and the metadata stored in the one or more memories, based on the at least one edited segment of the image file and the at least one edited segment of the metadata;
   determining, in response to a second terminal device accessing the image file, whether an image file the second terminal device has is the latest version; and
   determining, in response to determining that the image file the second terminal device has is not the latest version, a transmitting device to transmit the at least one edited segment of the image file and the at least one edited segment of the metadata to the second terminal device, among the electronic device and the first terminal device.

* * * * *